United States Patent [19]
Hersch et al.

[11] 3,830,090
[45] Aug. 20, 1974

[54] ELECTRICAL MEASURING APPARATUS EMPLOYING ANALOG CONDITION RESPONSIVE MEANS TO OPERATE REMOTE DIGITAL INDICATORS

[75] Inventors: Walter Hersch, Woodbury; Ira A. Rubel, Smithtown, both of N.Y.

[73] Assignee: Gull Airbonne Instruments, Inc., Smithtown, N.Y.

[22] Filed: July 27, 1972

[21] Appl. No.: 275,765

[52] U.S. Cl. .................................. 73/1 R, 73/304
[51] Int. Cl. ....................... G01f 23/26, G01f 25/00
[58] Field of Search....... 73/304 R, 304 O; 340/200; 324/61 R; 235/151.3, 151.33

[56] References Cited
UNITED STATES PATENTS

| | | | |
|---|---|---|---|
| 3,176,221 | 3/1965 | Stamler | 324/61 R |
| 3,301,056 | 1/1967 | Blanchard | 73/304 |
| 3,689,747 | 9/1972 | Milia | 235/151.3 |

*Primary Examiner*—S. Clement Swisher
*Attorney, Agent, or Firm*—Cooper, Dunham, Clark, Griffin & Moran

[57] ABSTRACT

This apparatus measures the weight of fuel in a plurality of tanks on an aircraft. In each tank, there are provided a plurality of capacitors connected so that their impedance varies linearly as an analog function of the volume of the fuel in the tank. A compensating capacitor, totally submerged in the fuel, provides another analog indication that varies with the density of the fuel. These analog indications are transmitted to a master indicator, where they serve as inputs to an analog-to-digital converter. The converter's digital output is the weight of fuel in the tank.

The master indicators for the several tanks are connected to a totalizer indicator which sums the readings of the master indicators and provides an indication of the total fuel in all the tanks. The totalizer also has a gross weight indicator in which a tare weight reading may be manually set. The tare weight is combined with the total fuel weight reading to give a reading of the total weight of the aircraft.

Each master indicator is connected through a digital transmission system to a repeater indicator located in a fuel loading panel on the aircraft wing. This digital transmission system is similar to that connecting each master indicator to the totalizer and comprises two control lines and a data line. The two control lines respectively carry synchronizing pulses and numerical order identification pulses. The data line carries trains of pulses representing the full weight being displayed by the master indicator.

14 Claims, 11 Drawing Figures

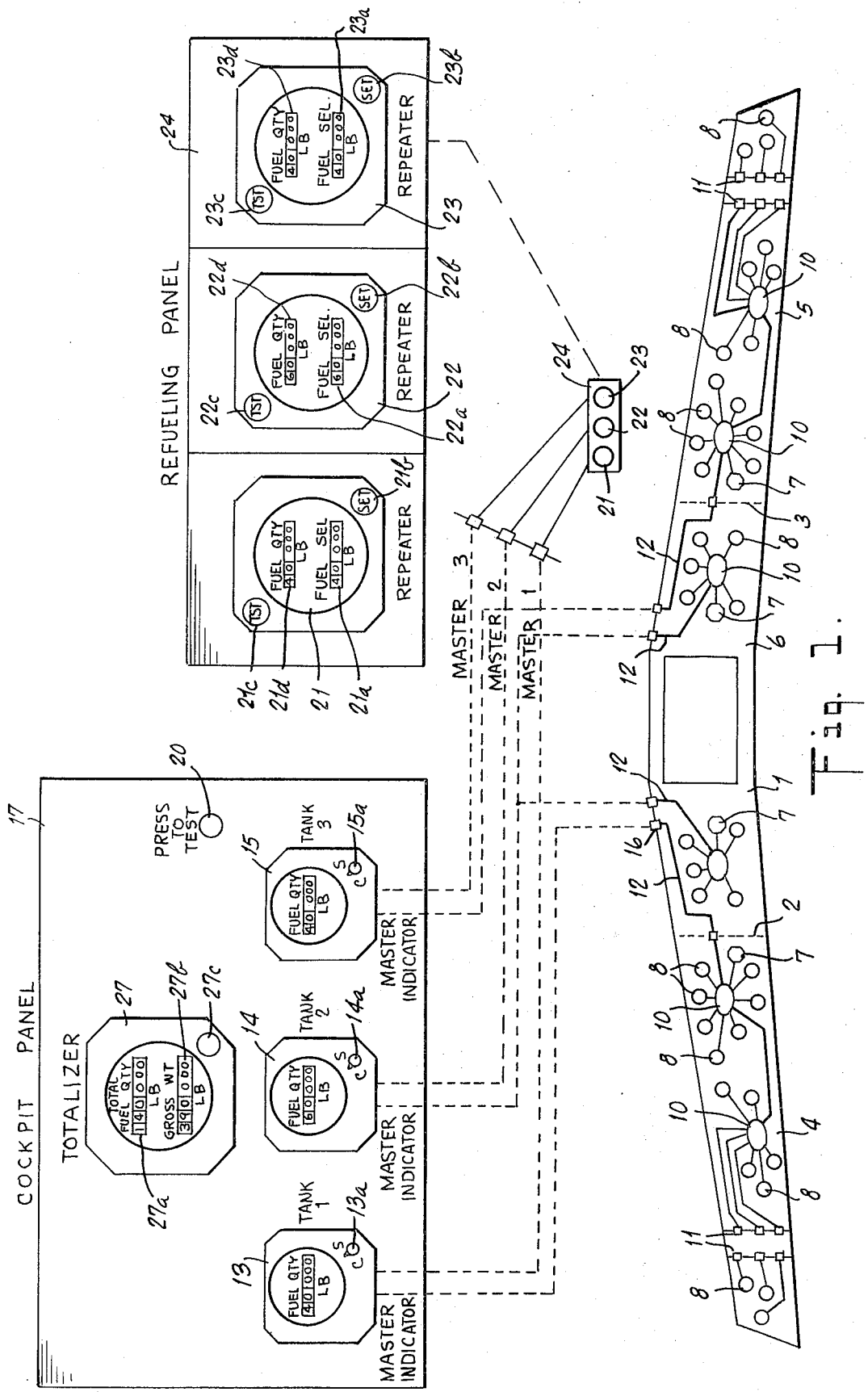

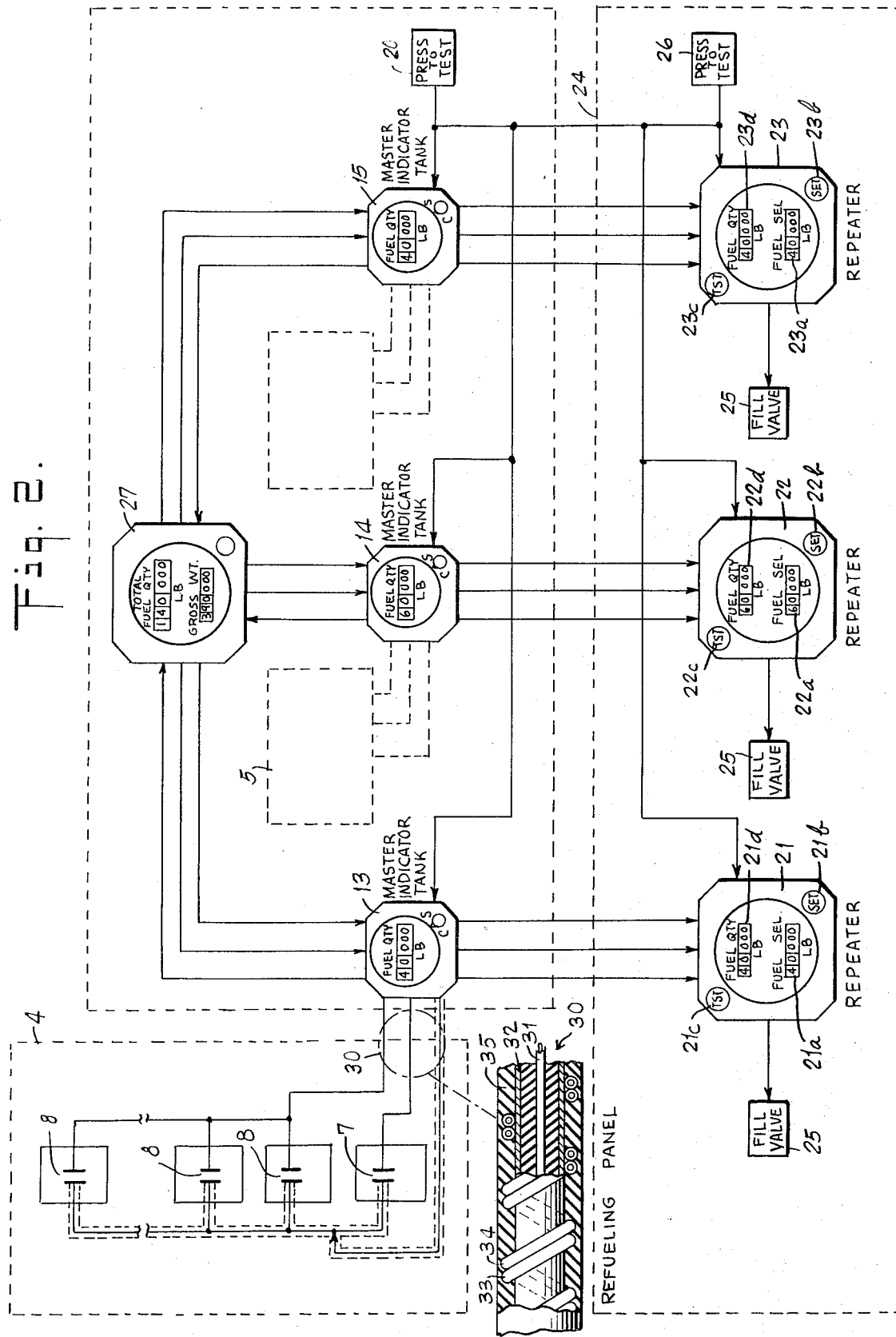

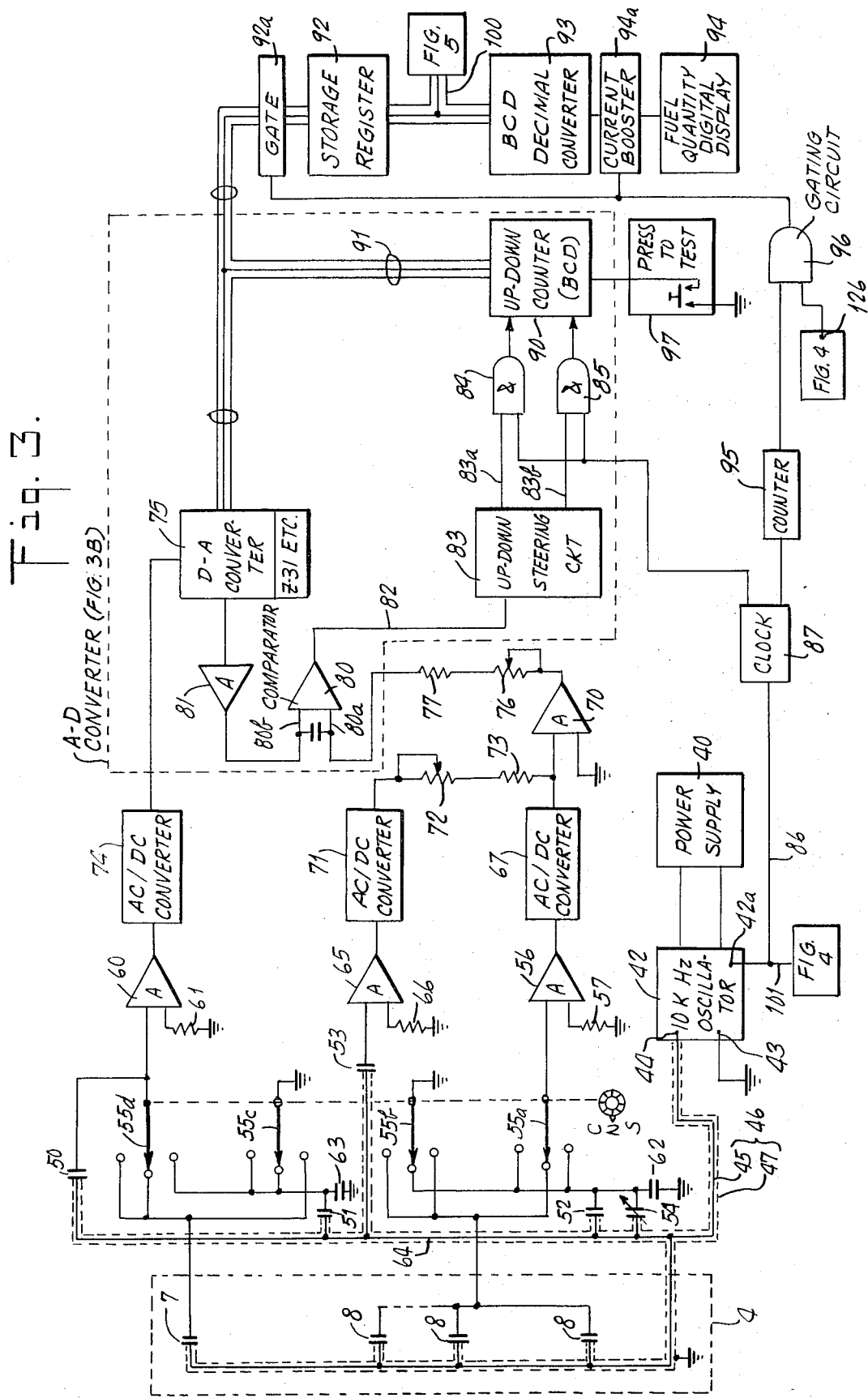

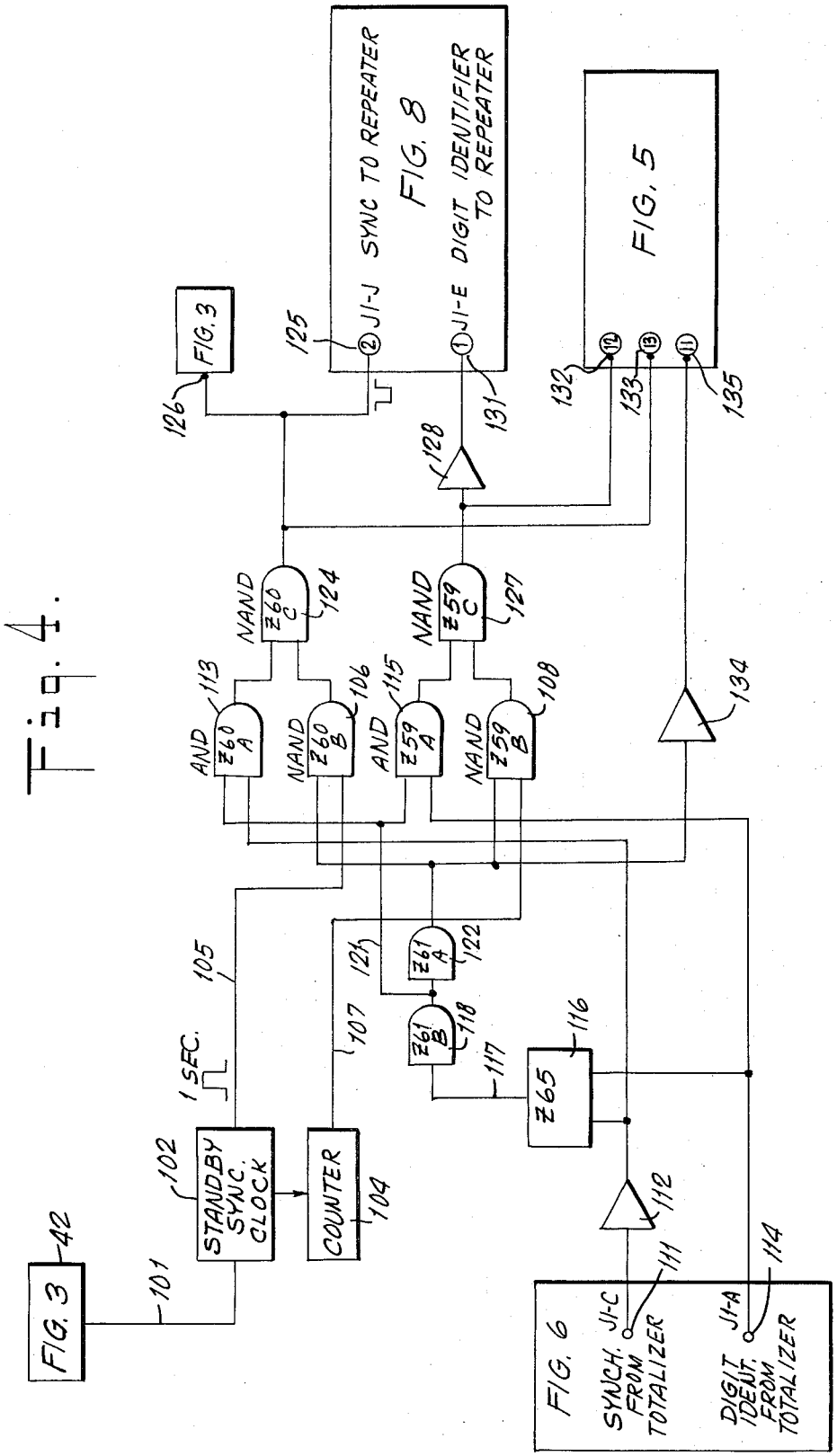

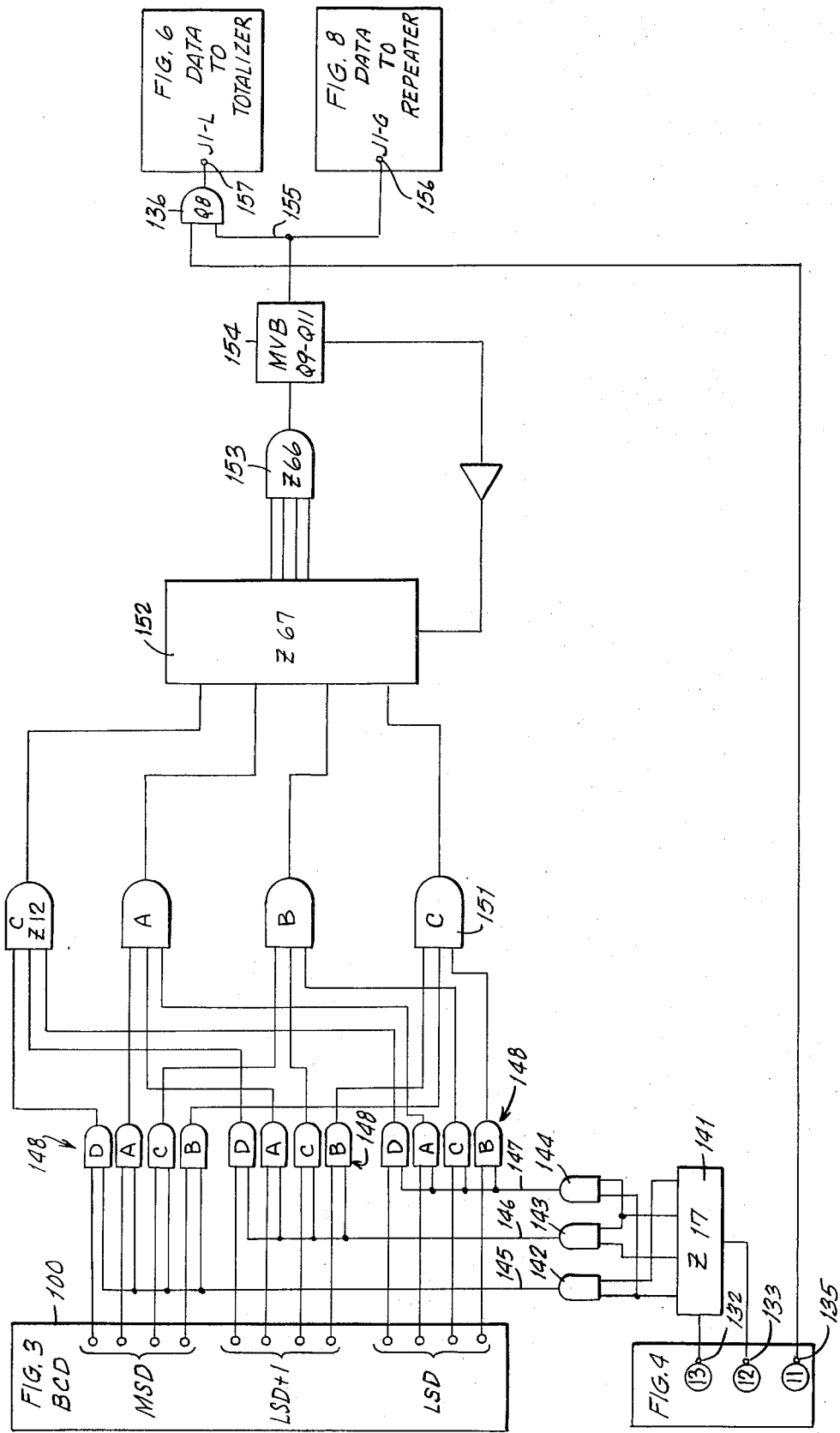

ELECTRICAL MEASURING APPARATUS EMPLOYING ANALOG CONDITION RESPONSIVE MEANS TO OPERATE REMOTE DIGITAL INDICATORS

CROSS-REFERENCES

This invention is disclosed herein as applied to capacitance type fuel gauges which may be the same as those disclosed in the application of Sebastian F. DiGiacomo, entitled "FUEL IMMERSIBLE APPARATUS FOR MEASUREMENT OF MASS OF LIQUID FUEL IN A TANK," Ser. No. 237,718, filed Mar. 24, 1972.

The apparatus disclosed herein is also useful in connection with the invention disclosed in the copending application of Martin Horowitz, Ser. No. 275,766 filed July 27, 1972, entitled "ELECTRICAL MEASURING APPARATUS EMPLOYING A PLURALITY OF CONDITION RESPONSIVE DEVICES."

BRIEF SUMMARY

This apparatus measures the quantity of liquid in a plurality of tanks, and is particularly intended for use in measuring the fuel supply on an aircraft. For each tank, two capacitor means in the tank are connected to an oscillator. The capacitance of one capacitor means varies with the quantity of fuel in the tank and the capacitance of the other capacitor means varies with the density of the fuel. The current passing through each capacitor means is converted to a proportional d.c. voltage. The d.c. voltage proportional to fuel density serves as the reference voltage for an analog-to-digital converter. The d.c. voltage proportional to fuel quantity in the tank, less an amount which is proportional to the value of the fuel quantity measuring capacitor means when the tank is dry, serves as the analog input to the analog-to-digital converter. The output of the analog-to-digital converter is a digital signal which represents the wieght of the fuel in the tank and is equal to the ratio of the analog signal input to the reference voltage input to the analog-to-digital converter.

The digital output of the analog-to-digital converter is transmitted to a storage register, whose data is periodically transferred to a digital display indicating the fuel quantity in the particular tank. The output of the storage register is also converted to a serial digital code which is transmitted over a data pulse line to a totalizer indicator and over another data line to a repeater indicator. The totalizer indicator is provided with a gross weight indicator which can have a tare weight manually inserted into its reading and the fuel weight is then added to the tare weight to give the gross weight.

The same totalizer indicator serves a plurality of fuel tanks. Synchronizing signals and numerical order identification signals are sent from the totalizer indicator over control pulse lines to the master indicators for the individual tanks. The readings of master indicators are then transmitted in sequence over the data pulse lines to an adder at the totalizer.

Each master indicator is provided with a standby signal generating means so that in the event of failure of the source of synchronizing and numerical order identification signals from the totalizer, each master indicator and its associated remote repeater indicator will continue to operate independently of the totalizer indicator.

The digital transmission system connecting each master indicator to a repeater or totalizer indicator transmits a multiple decimal digit number as a plurality of trains of pulses, each train containing as many pulses as the numerical value of the particular digit. Where a totalizer indicator is used, the individual master indicators have digits of the same order scanned in sequence, so that for each order, the totalizer receives at an adder a number of pulses equal to the total of the digits in that numerical order at all of the master indicators. Representative prior art patents are:

Blanchard et al, U.S. Pat. No. 3,301,056, Jan. 31, 1967

Orr et al, U.S. Pat. No. 3,630,298, Dec. 28, 1971.

DRAWINGS

FIG. 1 is a diagrammatic illustration of a plural fuel tank arrangement and fuel measuring system for an aircraft, in which the present invention is employed.

FIG. 2 is another diagrammatic illustration showing the same system as FIG. 1, but showing only a single tank in detail and illustrating the wiring connections between major components more completely.

FIG. 3 is a wiring diagram of one set of tank elements and parts of one master indicator of the system of FIGS. 1 and 2.

FIGS. 4 and 5 are wiring diagrams which taken together with FIG. 3 provide a complete wiring diagram of a master indicator.

DETAILED DESCRIPTION

FIGS. 1–2

Figure 3A:
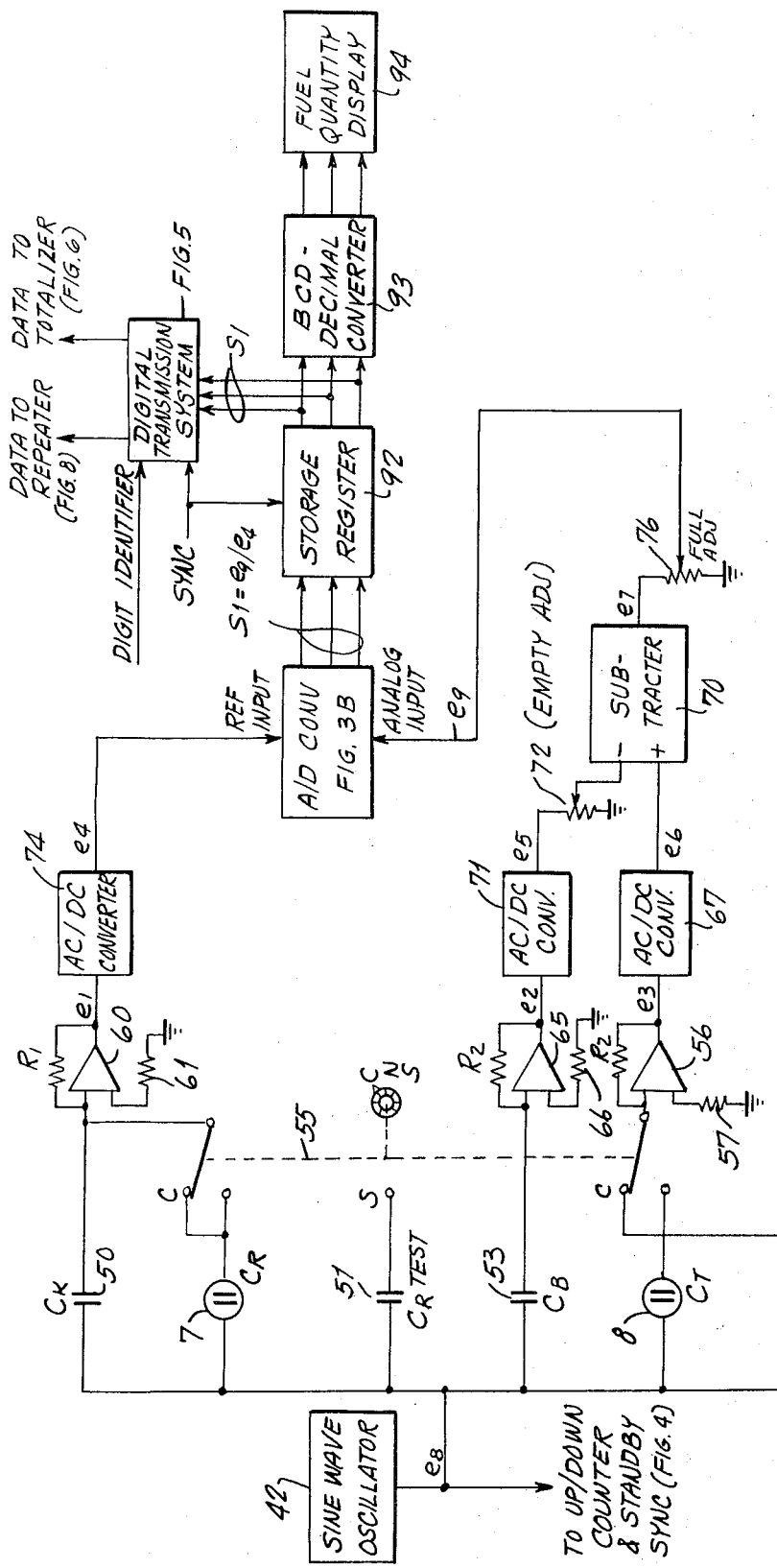
FIG. 3A is a simplified diagram of the system shown in FIG. 3, useful in understanding the invention.

These figures illustrate a fuel supply system for an aircraft. There is shown in FIG. 1 an aircraft wing 1 separated by bulkheads 2 and 3 into end tanks 4 and 5 and a center tank 6. In each of the end tanks 4 and 5, there is provided one compensating capacitor shown at 7 and indicated by an octagon. The center tank 6 has two compensating capacitors 7. Each tank has a plurality of level measuring capacitors 8, shown by circles in the drawing. Each capacitor is connected to a fault isolation probe 10, illustrated by an ellipse in the drawing. Each probe 10 serves as a junction point for the connection of several capacitors 8. In some cases the capacitors are connected to their fault isolation probes through bulkhead connectors, as shown at 11 in the case of the level measuring capacitors 47 in the wing tip portions of the end tanks.

Each fault isolation probe 10 is connected by means of a coaxial cable and two unshielded cables 12 to one of a plurality of master digital indicators 13, 14 and 15. The cables 12 pass through bulkhead connectors where required, as shown diagrammatically at 16. The master indicator 13 displays the fuel quantity in the left end tank 4. The master indicator 14 displays the fuel quantity in the center tank 6. The master indicator 15 displays the fuel quantity in the right end tank 5.

Each of the master indicators is provided with a test switch 13a, 14a, 15a, which is a three-position switch movable from a normal center position either to a left-hand position marked C, or a right-hand position marked S. The master indicators 13, 14 and 15 are located in a cockpit panel 17, which is also provided with a "Press-to-Test" switch 20. When checking the indicator, the press-to-test switch is first used. This switch should cause the three master and repeater indicators to read 99900, and the totalizer indicator (described below) to read 299600. If that test secures the correct reading on all indicators, then the capacitors associated with the respective master indicators may be tested by using one of the three-position switches 13a, 14a, 15a. This switch is first moved to its S position. In that position capacitors of fixed value are substituted for capacitors 7 and 8 in the fuel measuring circuit, so that the master indicator should read at a particular value, e.g., 10500. If that test turns out correctly, then the switch 13a is turned to the C position, in which a fixed capacitor is substituted for the measuring capacitors 8, but the compensating capacitor 7 is left in the circuit. Under these circumstances, the master indicator should read, for example, 13900 if the tank is completely dry and 10500 if the compensating capacitor is covered with fuel.

Each of the three master indicators 13, 14 and 15 controls one of three repeater indicators 21, 22, and 23, one for each of the fuel tanks. The repeater indicators are located in a refueling panel 29 at a convenient location on a wing of the aircraft where they are visible to the person in charge of filling the fuel tanks. Each of the repeater indicators is provided with a fuel selector indicator, shown respectively at 21a, 22a, and 23a. The fuel selector indicators are settable manually by set knobs 21b, 22b, 23b. Each repeater indicator is also provided with a test button 21c, 22c, 23c.

Each repeater indicator also includes a digital fuel quantity indicator 21d, 22d, 23d. These indicators repeat the indication of the master indicators. Each repeater indicator controls a fuel supply valve 25 (FIG. 2) for its associated tank, and closes that valve whenever the fuel quantity indicator reading is equal to or greater than the fuel selector indicator reading. When the fuel quantity indicator reads less than the fuel selector indicator, then the fuel supply valve 25 may be opened.

The refueling panel 24 also includes a press-to-test switch 26 (FIG. 2), that is connected in parallel with the press-to-test switch 20 (FIG. 1) located on the cockpit panel. When that switch is actuated, the fuel quantity indicators 21d, 22d, 23d on the refueling panel should all read 99900.

The master indicators 13, 14 and 15 control a totalizer indicator 27, located in the cockpit panel 17, and having a total fuel quantity indicator 27a, which indicates the total weight of fuel in all three of the tanks. The totalizer 27 is also provided with a gross weight indicator 27b which is settable by means of a knob 27c to a value equal to the tare weight of the aircraft. After this indicator 27b is manually set to the tare weight of the aircraft, the total fuel weight of the aircraft is summed with the tare weight, and the resultant aircraft gross weight is displayed on the gross weight indicator 27b.

FIG. 2 illustrates in greater detail the connections between the master indicators 13, 14 and 15, the totalizer indicator 27 and the repeater indicators 22, 23 and 24. The tank 4 is shown diagrammatically as including three fuel level capacitors 8 and one compensating capacitor 7.

Also shown in FIG. 2 is a section of the cable 30 connecting the master indicator 13 to the capacitors 7 and 8 in the tank 4. As there shown, the cable 30 comprises an inner conductor 31 provided with a coaxial cylindrical shield 32. The return conductors 33 and 34 from the low voltage sides of the capacitors 7 and 8 are shown as being wound helically around the shield 32. The shield 32 is suitably insulated from the conductor 31 and the entire cable is covered with an insulating sheath 35.

MASTER INDICATOR — FIGS. 3–5

This wiring diagram illustrates the circuit elements in the tank 4 and in part of the master indicator 13.

The aircraft fuel tank 4 encloses three level sensing capacitors 8, and a compensating capacitor 7 for the purpose of measuring the fuel level in the tank. The physical distribution of the capacitors 7 and 8 within the tank is shown in detail in the copending DiGiacomo application, Ser. No. 237,718, mentioned above.

Power is supplied to the measuring apparatus from a power supply 40, which may be a conventional 400 cycles aircraft power supply. Energy flows from the power supply through suitable conductors to an oscillator 42 operating at a high frequency, e.g., 10 KHz, and at a high voltage of e.g., 10 VRMS.

The oscillator 42 has a grounded terminal 43 and an ungrounded terminal 44 connected to a conductor 45 which is part of a coaxial cable 46 including a cylindrical shield 47. The shielded conductor 45 extends to one terminal of each of the capacitors 7 and 8. The shield 47 is grounded and extends from the oscillator 42 throughout the length of the conductor 45 and all branches thereof to the high voltage terminals of all the impedance elements connected thereto, including capacitors 7 and 8.

The system shown includes a fixed capacitor 50, two fixed test capacitors 51 and 52, and a fixed capacitor 53, all connected to shielded conductor 45 or branches connected thereto. A variable test capacitor 54 is connected in parallel with fixed capacitor 52.

A control switch 55 has a knob for operating four contacts 55a, 55b, 55c and 55d. When the knob 55 is in its middle or N position, as shown in the drawing, the low voltage terminals of each of the capacitors 8 are connected through the contact 55a to one input terminal of an operational amplifier 56, whose other input terminal is grounded through a resistor 57. The low voltage terminal of capacitor 7 is connected through contact 55d to an input terminal of an amplifier 60 whose other input terminal is connected to ground through a resistor 61. The test capacitor 51 has its low voltage terminal connected to ground through contact 55c. The test capacitors 52 and 54 have their low voltage terminals connected to ground through contact 55b. Capacitors 62 and 63 are connected across contacts 55a and 55c, respectively, to simulate cable loading during test.

The fixed capacitor 50 has its low voltage terminal connected to the input terminal of operational amplifier 60. The fixed capacitor 53 has its high voltage terminal connected to a conductor 64 which is shielded and connected to the shielded conductor 45. The low voltage terminal of capacitor 53 is connected to an input terminal of an operational amplifier 65 whose opposite input terminal is grounded through a resistor 66.

When the switch 55 is turned from the N position to the C position shown in the drawing, then the low voltage terminals of capacitors 8 are disconnected from the amplifier 56 and are connected to ground through contact 55b. The low voltage terminals of test capacitors 52 and 54 are then connected to the input of amplifier 56.

When the switch 55 is moved to the S position shown in the drawing, then test capacitors 52 and 54 are substituted for capacitors 8, as in the C position. Furthermore, the low voltage terminal of capacitor 7 is disconnected from amplifier 60 and is connected to ground through contact 55c. The low voltage terminal of test capacitor 51 is then connected to amplifier 60 through contact 55d.

The output terminal of operational amplifier 56 is connected through an AC-DC converter 67 to the input terminal of an operational amplifier 70. The output terminal of operational amplifier 65 is connected through an AC-DC converter 71, a variable resistor 72 and a fixed resistor 73 to the same input terminal of amplifier 70. The output terminal of amplifier 60 is connected through an AC-DC converter 74, and a suitable amplifier, if required, to a biasing terminal of a digital-to-analog converter 75. The output terminal of the amplifier 70 is connected through a variable resistor 76 and a fixed resistor 77 to an input terminal 80a of a comparator circuit 80. The output terminal of the digital-to-analog converter 75 is connected through an operational amplifier 81 to the other input terminal 80b of the comparator 80.

Comparator 80 produces an output signal of one value (binary value 1) when one input potential is higher than the other. If the other input potential is higher, then the output potential will be another value (binary value 0). The output of comparator 80 is connected through a conductor 82 to an up/down steering circuit 83 having two outputs 83a and 83b connected respectively to inputs of AND circuits 84 and 85. The oscillator 42 has an output terminal 42a connected through a conductor 86 to a clock circuit 87 having an output connected to both of the other inputs of the two AND circuits 84 and 85.

Figure 6:
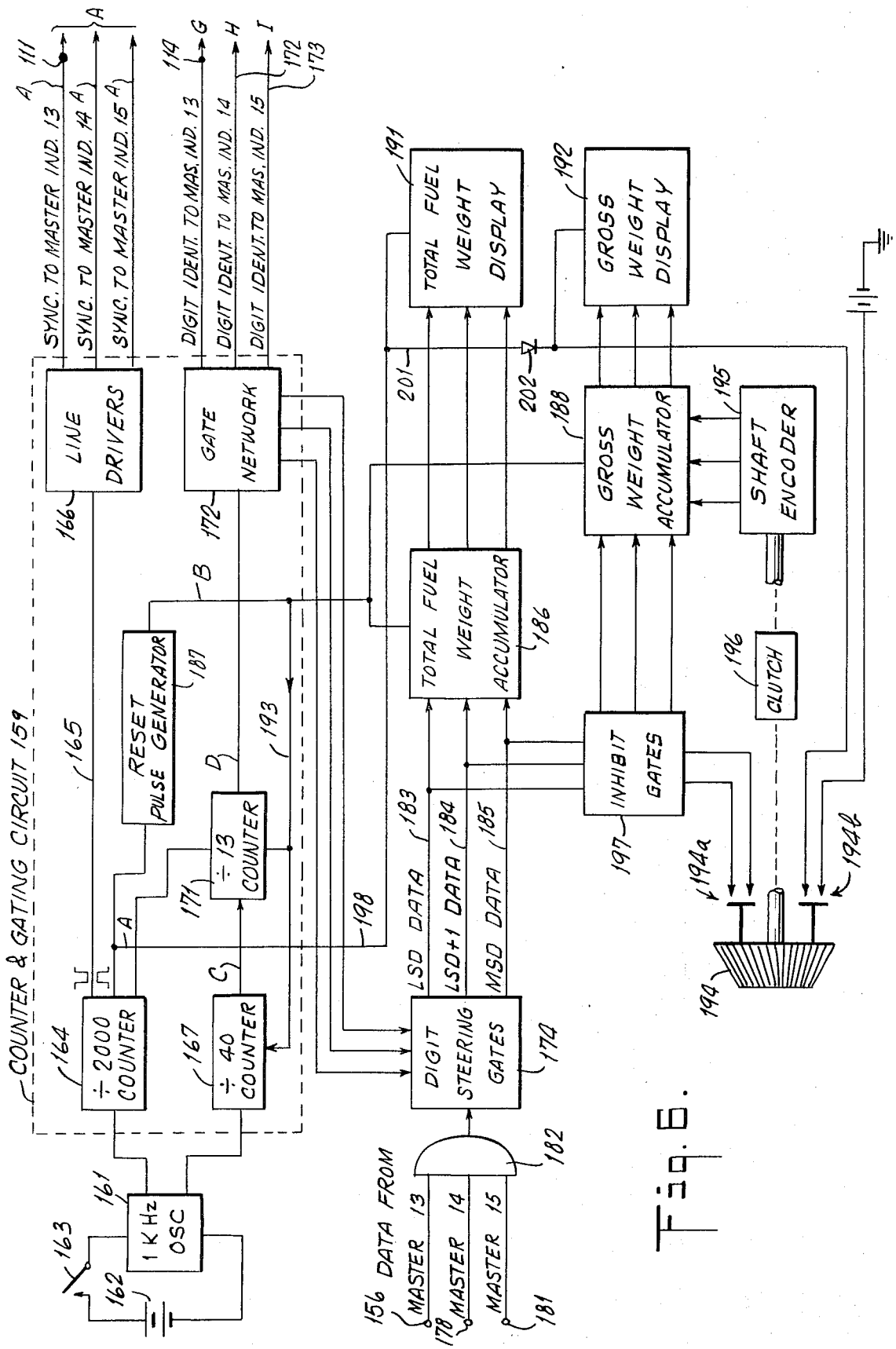
FIG. 6 is a wiring diagram of a totalizer indicator.

The outputs of the AND circuits 84 and 85 are connected to the two principal inputs of an up/down counter 90, which has a binary coded decimal output. The counter is illustrated as having an output for three decimal digits, each digit requiring four binary output lines. The counter 90 has a set of 12 BCD output lines 91 which are connected to the input of the digital-to-analog converter 75, and are also connected through a gate means 92a to the input of a BCD storage register 92. The storage register 92 has a set of BCD output lines connected to a BCD-to-decimal converter 93. The converter 93 has a set of decimal output lines connected through a current booster 94a to a fuel quantity digital display 94. The gate 92a and current booster 94a are controlled by signals from a counter 95 driven by the clock 87, and by a synchronizing signal from a source described below in connection with FIGS. 4 and 6, which signals are coordinated in a gating circuit 96.

The reading accumulated in the converter 93 is periodically transferred (e.g., once every 2 seconds) to the digital display 94.

The counter 90 has an input connected to a test switch 97. When the test switch 97 is closed, the inputs of the counter 90 from the AND circuits 84 and 85 are inhibited and a special code is impressed on the counter to produce a particular reading on the digital display 94. This operation tests all the circuit elements from the counter 90 through the digital display.

OPERATION OF FIG. 3

The capacitances of the level sensing capacitors 8 are added together at their common low voltage terminal. The output potentials of the converters 67 and 71 are added algebraically at the input of amplifier 70. Variable resistor 72 provides an empty tank calibration adjustment. The variable resistor 76 provides a full tank calibration adjustment. The capacitor 7 compensates for variations in the density of the fuel so that the reading on the digital display 94 presents an accurate measurement of the weight of the fuel, rather than its volume. The output of the converter 74 is connected to the reference input of the digital-to-analog converter 75.

The comparator 80 balances the signal at input terminal 80a which is a continual measure of the mass of fuel in the tank, against the potential at terminal 80b which is a measure of the reading of the up/down counter. If the up/down counter 90 does not accurately reflect the quantity of the mass of fuel in the tank at any instant, then the comparator 80 controls the up/down steering circuit 83 to present further count up pulses or count down pulses to the counter 90, so that that counter is continuously being brought up-to-date as to the mass of fuel in the tank.

The BCD output signals from the counter 90 are continuously available at the gate 92a. Gate 92a is enabled by the negative edge of the sync pulse allowing the BCD data to pass through to the storage register 92. The output of the storage register is converted from BCD code to decimal code by the BCD to decimal converter 93. Power is supplied to current booster 94a by the positive edge of the sync pulse, at which time the fuel quantity display is updated to read the then current fuel quantity.

FIG. 3A

FIG. 3A is a simplified diagram of the system of FIG. 3 useful in understanding the invention. In FIG. 3A the same reference numerals have been employed as in FIG. 3 to designate corresponding components. Since the components have all been described above in connection with FIG. 3, the description will not be repeated here.

With reference to FIG. 3A, the output signal $e_8$ from the since wave oscillator 42 may be expressed as follows:

$$e_8 = A \sin 2\pi ft \tag{1}$$

where $A$ is a constant, $f$ is the frequency of the signal generated by the oscillator, and $t$ represents time.

The signals $e_1$, $e_2$, and $e_3$ generated by the operational amplifiers 60, 65 and 56 may be given as follows:

$$e_1 = -2\pi f A R_1 (C_R + C_K) \cos 2\pi f t \tag{2}$$

$$e_2 = -2\pi f A R_2 C_B \cos 2\pi f t \tag{3}$$

$$e_3 = -2\pi f A R_2 C_T \cos 2\pi f t \tag{4}$$

where $R_1$ is the resistance value of feedback resistor $R_1$ of the operational amplifier 60, $R_2$ is the resistance value of feedback resistors $R_2$ of operational amplifiers 65 and 56, $C_T$ is the capacitance valve of the level measuring capacitors 8, $C_K$ is the capacitance value of the fixed capacitor 50, $C_B$ is the capacitance value of fixed capacitor 53 that equals $C_T$ when the fuel tank is dry, and $C_R$ is the capacitance value of capacitor 7 that compensates for fuel density variations.

The AC/DC converters 74, 71 and 67 generate d.c. voltage output signals $e_4$, $e_5$ and $e_6$ that are proportional to the peak amplitude of the a.c. input signals $e_1$, $e_2$ and $e_3$. The d.c. output signals from the converters are as follows:

$$e_4 = -2\pi f A R_1 K (C_R + C_K) \tag{5}$$

$$e_5 = -2\pi f A R_2 K C_B \tag{6}$$

$$e_6 = -2\pi f A R_2 K K C_T \tag{7}$$

in which $K$ is a constant of proportionality of the AC/DC converters.

The output $e_7$ of the subtractor 70 is given as follows:

$$e_7 = e_6 - e_5 = -2\pi f A R_2 K (C_t - C_b) \tag{8}$$

The empty adjustment potentiometer 72 adjusts the value of the output signal $e_5$ from the converter 71 so that $e_5$ is equal to $e_6$ when the fuel tank is empty.

Figure 3B:
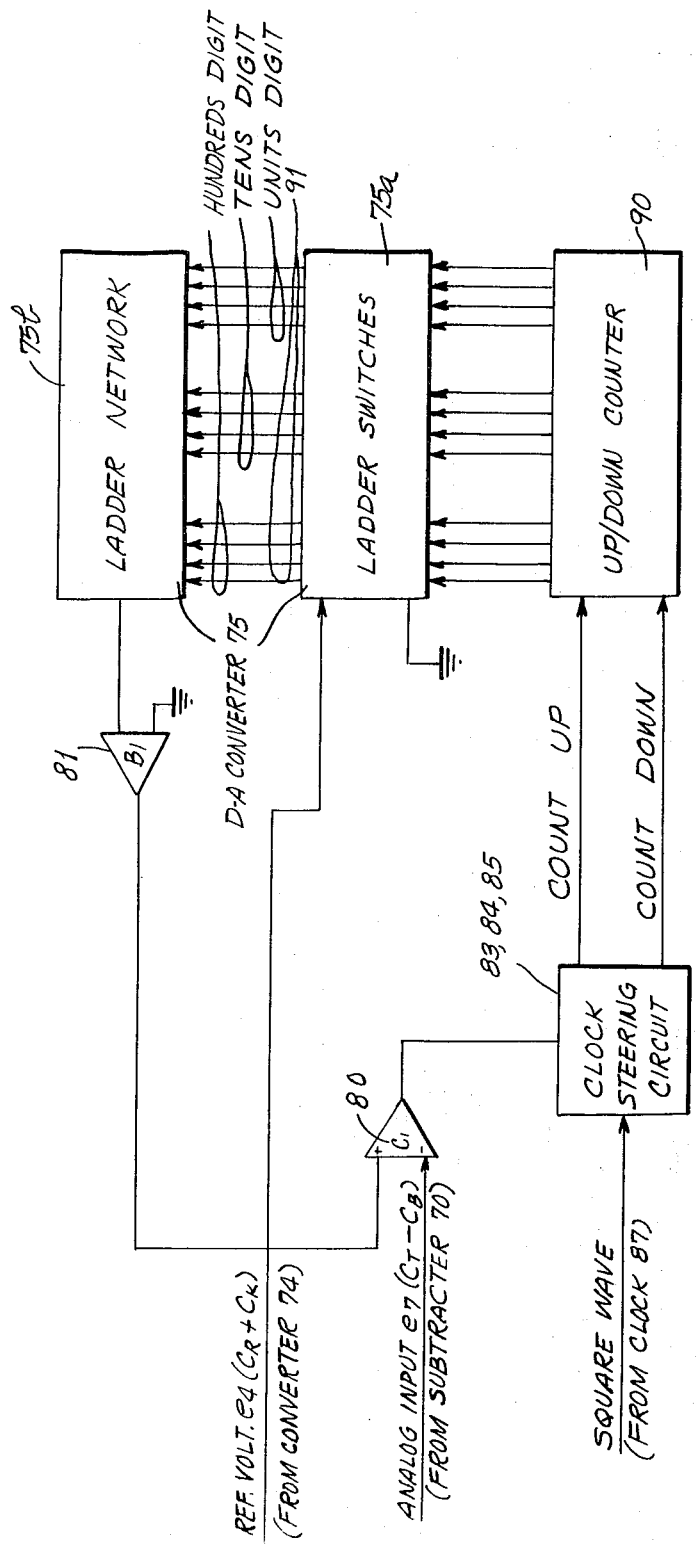
FIG. 3B is a diagram of an analog-digital converter forming a part of the system shown in FIGS. 3 and 3A.

The A/D converter that constitutes the circuit of FIG. 3B, provides a digital signal output S1 from the analog inputs which is the equivalent of $e_9$ divided by $e_4$ and which is expressed as follows: $S1 = e_9/e_4 = -2\pi f A R_2 K k (C_T - C_B)/-2\pi f A R_1 K (C_R + C_K)$ (9)

where $k$ is a constant representing the adjustment of the signal $e_7$ by the full adjustment potentiometer 76 to produce the signal $e_9$, inasmuch as:

$$e_9 = k e_7 \tag{10}$$

The equation for S1 may be reduced to the following form:

$$S1 = k R_2 (C_T - C_B)/R_1 (C_R + C_K) = K_r (C_T - C_B)/(C_R + C_K) \tag{11}$$

The full adjustment potentiometer adjusts the value of the signal $e_7$ such that $K_R$ (representing $k\,R_2/R_1$) equals 1. Accordingly, the expression for the digital output signal S1 is as follows:

$$S1 = C_T - C_B/C_R + C_K \tag{12}$$

The value of S1 as given in equation (12) is proportional to fuel weight. The expression of equation (12) is completely independent of the sine wave amplitude A and its frequency f The digital output signal from the A/D converter is applied to storage register 92. Data is stored within the register in binary coded decimal form (BCD). Updating of the register is controlled by the sync signal. The output of the storage register 92 is converted to decimal code by BCD to decimal converter 93. This latter converter drives the fuel quantity display unit 94. The storage register 92 also supplies signals to the digital transmission system shown in FIG. 5. This latter system is under the control of sync and digit identifier signals and generates serial data code signals sent to the repeater and totalizer units as described below.

FIG. 3B

This figure illustrates the A/D (analog to digital) converter so designated in FIGS. 3 and 3A. Reference numerals the same as in FIG. 3 have been used in FIG. 3B to designate like components. Because the components have been described above in connection with FIG. 3, that description will not be repeated here. The operation is as follows:

The up/down counter 90 typically consists of 3 decade counters, and feeds ladder switches 75a. These ladder switches are essentially electronically controlled, single pole, double throw switches that connect the inputs of ladder network 75b to either ground or a reference voltage (equal to $C_R + C_K$). The ladder switches and ladder network 75a and 75b constitute the D/A converter 75 in FIG. 3.

The output of the ladder network 75b is applied to amplifier 81 which is connected to the positive input of comparator 80. The other input of the comparator is an anlog input representative of the value $C_T - C_B$. The comparator 80 generates two output signals (binary signals), as follows: If $e_{10}$ is greater than $e_7$, a 1 output signal is generated by the comparator; if $e_{10}$ is less than $e_7$, a 0 output signal is generated.

The binary output signals from the comparator 80 are applied to a clock steering circuit which consists of up/down steering circuit 83 and gates 84 and 85 in FIG. 3. Square wave signals from the clock 87 of FIG. 3 serve as the clock signal for the A/D converter circuit of FIG. 3B, specifically as clock signals for the clock steering circuit.

If the input signal $e_{10}$ is greater than the input signal $e_7$ at the comparator 80, then the clock steering circuit output signal appears on the count down input line to the up/down counter 90. The counter 90 counts down until the signal $e_{10}$ is one step less than the signal $e_7$. At such a point the signal $e_7$ is greater than the signal $e_{10}$, and hence the clock steering circuit provides a count up signal to the up/down counter 90 to cause that counter to count upwardly. Thus the up/down counter 90 is always driven in a direction to tend to make the signals $e_{10}$ and $e_7$ equal. However, the system cannot null at $e_{10}$ equal to $e_7$, although the system is constantly driving toward a null. Near the null (at the null ± 1 count), the digital outputs of the up/down counter 90 represent $(C_T - C_B)/(C_R + C_K)$, which is the fuel weight.

FIG. 4

This figure illustrates the source of the synchronizing signals mentioned above in connection with logic circuit 96. For each master indicator, such as master indicator 13, there are available two sources of synchronizing signals and two sources of digit order identification signals. The normal source of these signals, when all elements of the system of FIG. 2 are operating, is at the totalizer 27. Each master indicator also has its own standby sources of synchronizing and digit order identification signals which become effective if either the synchronizing signal or the digit order identification signal from the totalizer is not received.

Figure 7A:
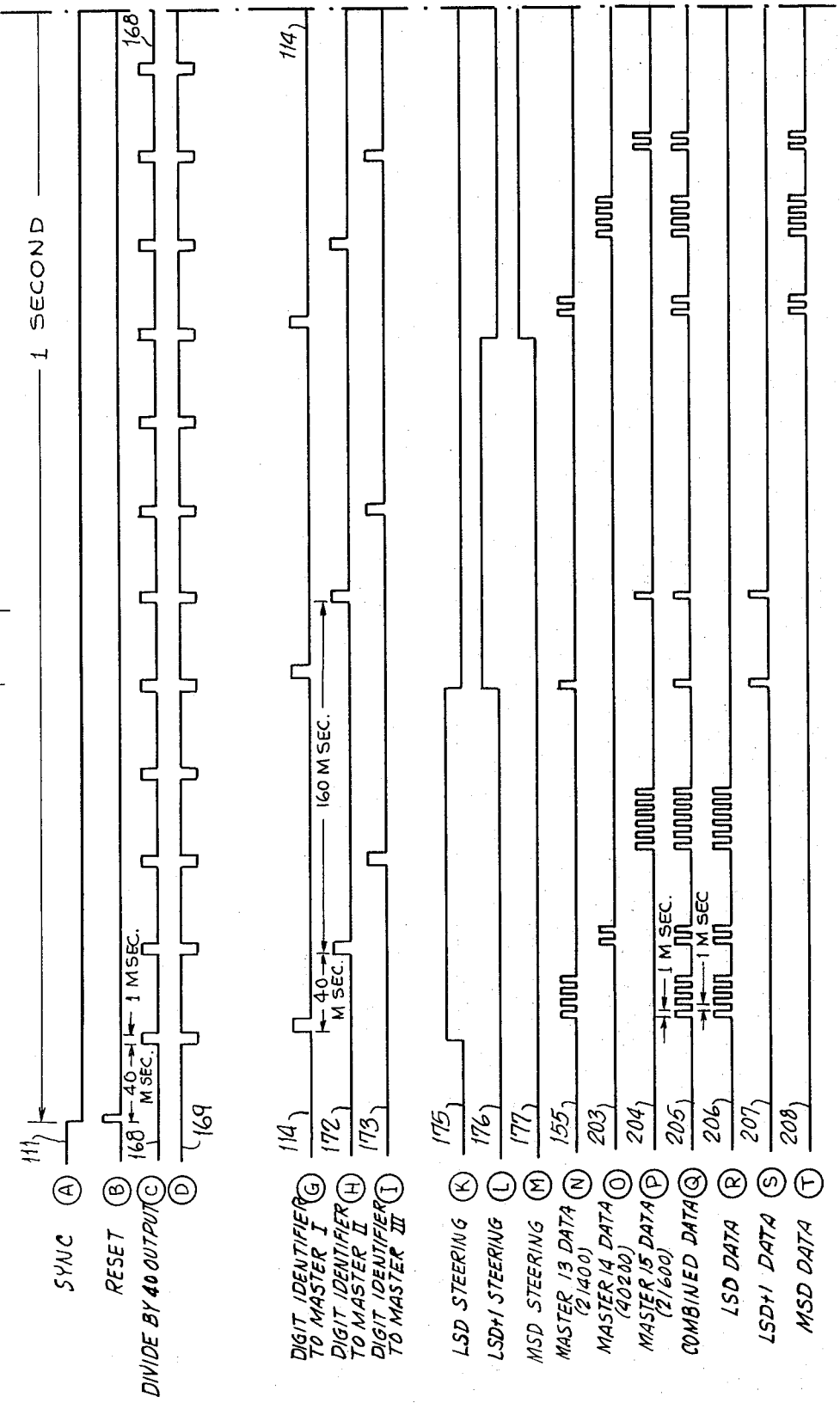
FIGS. 7A and 7B are graphical figures illustrating the variation with time of the digital signals in various parts of the apparatus.
Figure 7B:
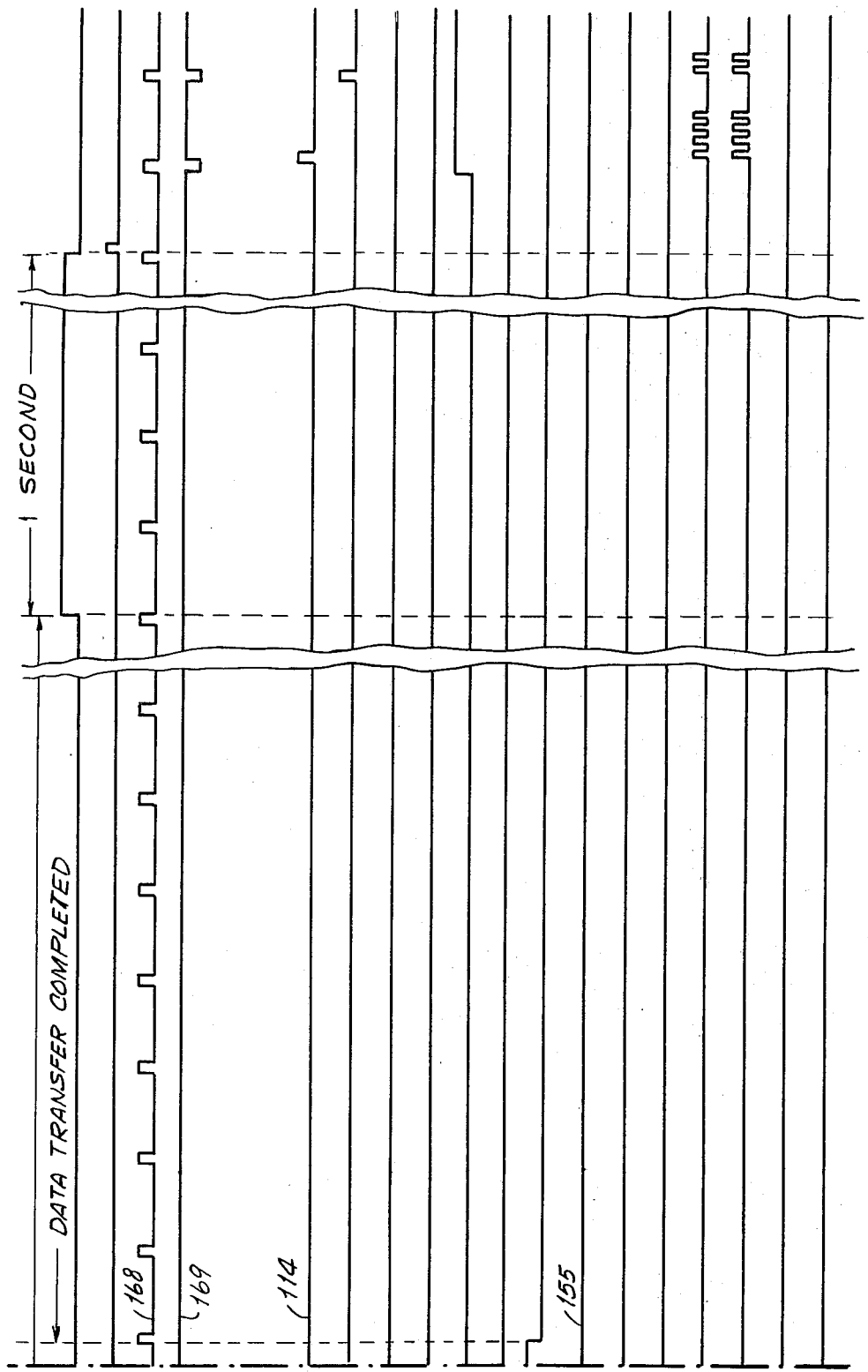

Referring to FIG. 4, it may be seen that an output line 101 from the oscillator 42 of FIG. 3 drives standby clock 102, which in turn drives a counter 104. The output of the standby clock 102, which is a synchronizing signal such as illustrated on line A of FIGS. 7A and 7B, is also fed through a conductor 105 to one input of a NAND gate 106. The counter 104 divides the output of the clock 102 by 40. If, as shown in FIGS. 7A and 7B, the synchronizing signal alternates between two values once every second, i.e., it has a period of two seconds, then the counter 104 produces an output pulse beginning every 50 milliseconds and lasting for 10 milliseconds. The output signals from counter 104 are fed through a conductor 107 to one input of a NAND gate 108.

The synchronizing signal from the totalizer 27 (FIG. 6) appears in FIG. 4 at a terminal 111 and proceeds through an amplifier 112 to one input of an AND gate 113. The digit order identification signal from the totalizer appears on a line 114, connected to one input of an AND gate 115. The synchronizing and digit order identification signals from the totalizer are also fed through two inputs of a logic network 116, which detects the presence of both signals and produces a signal on its output line 117 when both signals are present at its input. The signals on line 117 pass through a gate 118 to a conductor 121 connected to the other inputs of the AND gates 113 and 115. The output of gate 118 is also connected through a gate 122 to a line 123 connected to the other inputs of the NAND gates 106 and 108. The outputs of the NAND gate 106 and AND gate 113 are connected to the two inputs of a NAND gate 124, whose output is connected to a terminal 125 which supplies the synchronizing signal to the repeater 21 and also to a terminal 126 appearing in FIG. 3, and described above.

The outputs of the NAND gate 108 and the AND gate 115 are supplied to the two inputs of a NAND gate 127, whose output is connected through a suitable amplifier 128 to a terminal 131 which supplies the digit order identification signals to the repeater 21. The output of NAND gate 127 is also connected to a terminal 132 appearing in FIG. 5. The output of NND gate 124 is also connected to a terminal 133 appearing in FIG. 5. The output of gate 122 is connected through an amplifier 134 to a terminal 135 appearing in FIG. 5.

OPERATION OF FIG. 4

When the synchronizing signals (line A of FIGS. 7A and B and the digit order identification signals (line C of FIGS. 7A and B) are both present at the input terminals 111 and 114 of FIG. 4, they carry through the logical networks of that figure and appear at the output terminals 125, 126, 131, 132 and 133 of that figure. If either the synchronizing signal or the identification signal from the totalizer 27 is not received, then the standby signals from the clock 102 and the counter 104 are allowed to proceed through the gating network to the same output terminals 125, 126, 131, 132 and 133.

The signal at terminal 135 in FIG. 4 indicates whether the synchronizing and digit order identification signals are being received from the totalizer. If either of those signals is not being received, then a signal is transmitted through terminal 135 to a gate 136 (see FIG. 5) which blocks the transmission of data from the master indicator to the totalizer.

FIG. 5

The output of the storage register 92 in FIG. 3 is continuously connected to a set of BCD output lines 100, shown cabled together in FIG. 3 and separated in FIG. 5. The set of lines 100 includes four lines for the least significant digit (LSD), four lines for the next least significant digit (LSD + 1), and four lines for the most significant digit (MSD). The synchronizing signal from the totalizer appears at terminal 132 (FIGS. 4 and 5) as explained above. The digit order identification signal appears at terminal 133 (FIGS. 4 and 5), as also explained above. These two signals are supplied to the input terminals of a logic circuit 141 having four output lines connected in various combinations through three gates 142, 143 and 144 to a set of digit order identification output lines 145, 146 and 147.

Each of the three lines 145, 146 and 147 is connected to one input of one of three arrays of four AND gates 148. The other input of each AND gate is connected to one of the four input lines 100 corresponding to one of the three digits. The outputs of the AND gates 148 are connected to one input of a set of OR gates 151 whose outputs are connected through a logic circuit 152 and an OR gate 153 to a multivibrator 154. The array of gates 148, 151, 152, 153 together with multivibrator 154 produces a train of output pulses at a terminal 155 which is equal in number to the particular digit being counted, as determined by the signals on a selected one of the three sets of digit input lines 100. The three sets of digit input lines 100 are successively scanned by the digit identification signals appearing at terminal 133, as shown by the line 133 in FIGS. 7A and 7B. That line shows three pulse signals 160 microseconds apart. Each of the three pulse signals result in the scanning of a particular digit in the master indicator 13 and the delivery to the terminal 155 of a train of pulses, as shown by the three trains of pulses on line 155 in FIG. 7A. These trains of pulses are delivered through a terminal 156 to the repeater indicator 21 and are delivered through a gate 145 to a terminal 157 at the totalizer 27. The gate 136 is controlled by the signal input at terminal 135, so that no data is transmitted to the totalizer unless the synchronizing signal generating means and the digit order identification signal generating means at the totalizer are delivering their respective outputs to the master indicator 13.

If the synchronizing signal generating means and the digit order identification signal generating means at the totalizer are not both being received at the master indicator, then the flow of data from the master indicator 13 to the totalizer 27 is blocked at gate 136. Nevertheless, master indicator 13 and repeater indicator 21 continue to operate independently of the other master indicators and repeaters in the system, using the synchronizing signals generated at clock 102 (FIG. 4) and the digit order identification signals generated at counter 104.

TOTALIZER INDICATOR — FIG. 6

This figure illustrates in block diagram form the internal construction of the totalizer indicator which is shown generally at 27 in FIGS. 1 and 2.

A 1KHz. multivibrator 161 is supplied with electrical energy from a suitable source, shown as a battery 162. The energy supply is controlled by starting switch 163. The oscillator 161 feeds a counter and gating circuit 159 which generates the signals shown in FIGS. 7A and 7B (signals on lines 111, 114, 172 and 173). Specifically, the oscillator 161 feeds the input of a divide by 2,000 counter 164 having a square wave output with a period of 2 seconds. The square wave output of the divide by 2,000 counter is fed through a line 165 to a set of amplifiers identified in the block 166 as line drivers. The line drivers 166 supply the synchronizing signals to the master indicators 13, 14 and 15. The synchronizing signals are in phase to all the master indicators, and are shown at 111 in the timing diagram of FIGS. 7A and 7B.

The multivibrator 161 also feeds a divide by 40 counter 167 which provides a series of output pulses, shown at 10 milliseconds in line 168 of FIGS. 7A and 7B. Each output pulse is separated by an off interval shown as 40 milliseconds. The particular lengths of these intervals are chosen for convenience. The output of divide by 40 counter 167 is fed to a divide by 13 counter 171, whose output is shown at 172 in FIGS. 7A and 7B. Note that the line 172 is the inverse of line 168 through the first 13 counts and then drops to zero. The output of the divide by 13 counter 171 is supplied to gate network 172 which in turn supplies digit order identification signals to the master indicators 13, 14 and 15. These identification signals are shown on the lines 114, 172 and 173 of FIGS. 7A and 7B. The gate network also supplies digit order steering pulses to a set of digit steering gates 174. The digit steering pulses are shown on the line 175, 176 and 177 of FIGS. 7A and 7B. The data pulses from the master indicators 13, 14 and 15 appear at terminals 156, 178 and 181 respectively, and are fed to the input of an OR gate 182 into the digit steering gates 174. The digit steering gates 175 separate these data signals into three lines 183, 184 and 185. Line 183 carries the data pulses for the least significant digit (LSD). Line 184 carries the data pulses from all three masters for the next most significant digit (LSD + 1). Line 185 carries the data pulses for the most significant digit (MSD) for all three masters. The pulses on the lines 183, 184 and 185 are supplied to a total fuel weight accumulator 186 which stores the pulses and produces the necessary carryovers to totalize the data.

An output line of the divide by 2,000 counter 164 extends to a reset pulse generator 187 which has its output connected to the total fuel weight accumulator 186 and a gross weight accumulator 188. When the reset pulse generator produces a pulse, at the end of the first second in the counting period, at which time all the data has been transferred to the accumulators 186 and 188, then the pulses reaching accumulators 186 and 188 from the pulse generator 187 cause the accumulators to transmit their data to a total fuel weight display 191 and a gross weight display 192, respectively. The reset pulse generator also sends a pulse at the end of each synchronizing cycle along a line 193 to reset the divide by 40 counter 167 and the divide by 13 counter 171.

A knob 194 operates shaft encoder 195. The shaft encoder 195 is connected to knob 194 through a clutch 196. In order to engage the clutch so that the knob 194 may actuate the shaft encoder, the knob 194 must be pushed in, i.e., to the right as it appears in FIG. 6, thereby closing two switches 194a and 194b. Closure of switch 194a actuates a set of inhibit gates 197 which prevent the data on the lines 183, 184 and 195 from reaching the gross weight accumulator 188, to prevent the simultaneous appearance at that accumulator of data pulses from two different sources. Switch 194b closes a circuit to supply an energizing signal to the gross weight display 192 for the purpose of cutting off actuation of that display until the operation of the shaft encoder is completed.

During the last half of each cycle of the divide by 2,000 counter 164, a signal is transmitted through lines 198, 201 and diode 202 to gating input terminals of the displays 191 and 192. Transmissions of this signal to the display transfers the data accumulated in the accumulators 186 and 188 to the display 191 and 192, respectively.

In FIGS. 7A and 7B, the line 155 shows the data transmitted from the master indicator 13. The data to be transmitted represents a reading of 21,400 pounds. The last two digits are not counted in the system illustrated, so that the least significant digit is the hundreds digit. It will be seen that line 155 contains three trains of pulses, the first consisting of four pulses representing the hundreds digit, the second consisting of a single pulse representing the thousands digit and the third consisting of two pulses representing the ten thousands digit. Line 20 shows the data transmitted from the master indicator 14, illustrated as 40,200 pounds and consisting of two trains of pulses, the first representing the hundreds digit and the last train representing the ten thousands digit. Note that there is no pulse train representing the thousands digit, which is zero in this instance.

The line 204 shows the data transmitted from the master indicator 15 and consists of a train of three digits, respectively 6, 1 and 2, representing a weight of 21,600 pounds. The combined data from the three masters is shown on the line 205 and represents the signals appearing at the output of the OR gate 182. The digit steering gates 174 separates this data into three trains of pulses respectively shown on the line 206, 207 and 208. These pulse trains count the LSD, LSD + 1 and MSD digits respectively, and these trains are fed to the accumulators 186 and 188.

REPEATER INDICATOR — FIG. 8

Figure 8:
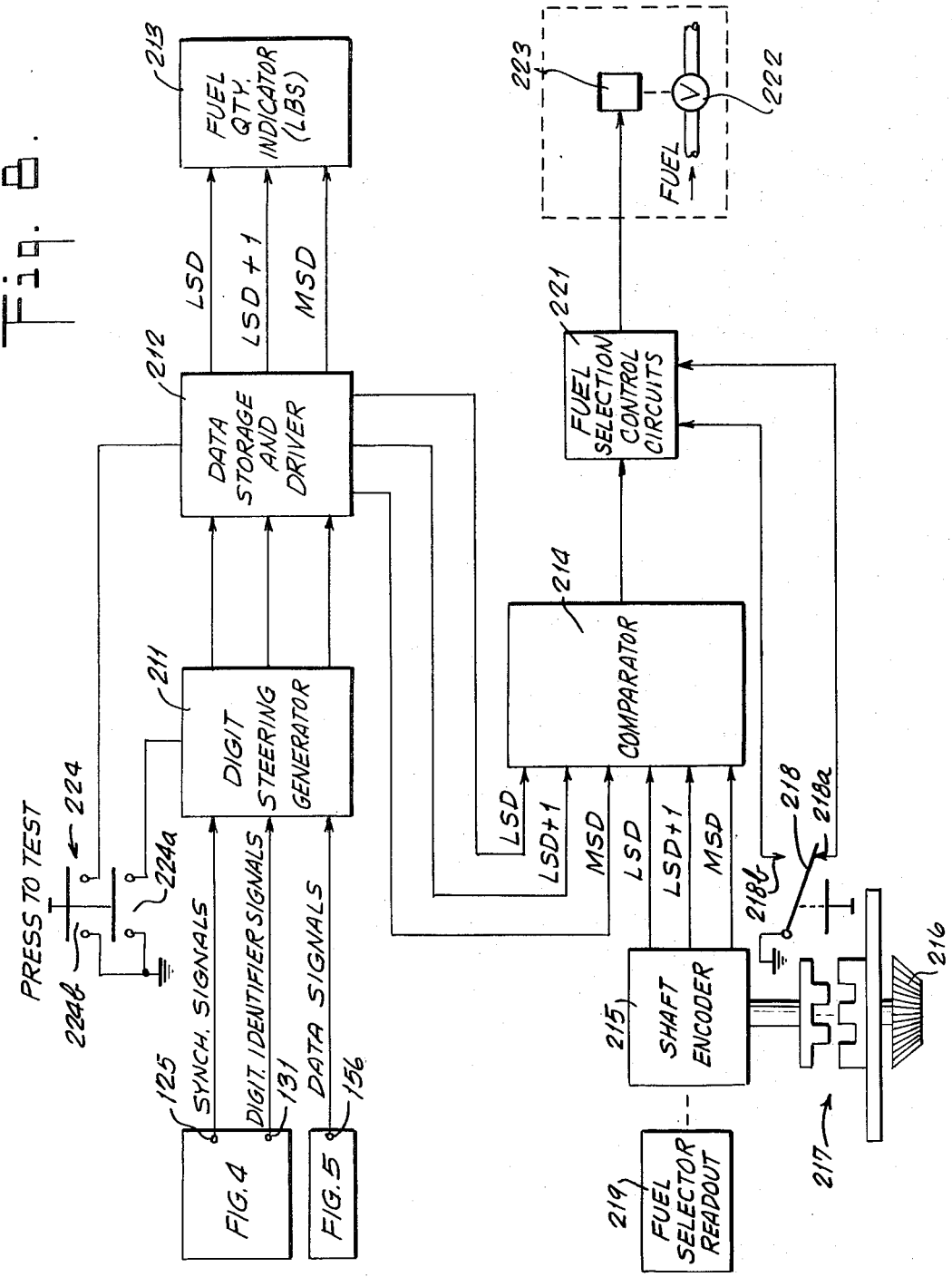
FIG. 8 is a wiring diagram of one of the repeater indicators in the system of FIGS. 1 and 2.

In the repeater indicator of FIG. 8, the synchronizing signals are received from terminal 125 of FIG. 4, the digit order identification signals are received from terminal 131 of FIG. 4, and the data signals are received from terminals 156 of FIG. 5. All of these signals are transmitted on separate lines to a digit steering generator 211 which separates the data signals, which are received on a single line, into trains on separate lines representing the separate digits. The operation is comparable to the separation which occurs between line 205 of FIG. 7A and lines 206, 207, 208, except that there is only one master indicator involved. The signals are transmitted from the digit steering generator on three digit order lines to a data storage and driver unit 212, which corresponds to the accumulator 186 of FIG. 6. The data storage and driver unit 212 has an output connected to a fuel quantity indicator 213 which shows the fuel quantity in the particular tank.

The data storage unit 212 has another set of digital order outputs connected to one set of inputs of a comparator 214. Comparator 214 has a second set of inputs supplied by a shaft encoder 215 rotatable by a knob 216 acting through a clutch 217. A fuel selector readout 219 is mechanically connected to the shaft encoder 215 to show the setting of the encoder. When it is desired to change the setting of the encoder 215, it is necessary to push the knob 216 in (upwardly as it appears in FIG. 8), thereby operating a switch contact 218 from a lower position in which it engages a stationary contact 218a and an upper position where it engages a contact 218b. Contacts 218, 218a and 218b actuate fuel selection control circuits 211 shown as a single block. The circuits 221 permit opening of a fuel supply valve 222 by energization of a solenoid 223 whenever the quantity of fuel in the tank is less than the quantity set on the fuel selector readout 216. The circuits 221 also prevent opening of the valve 222 when the reading of the fuel selector 219 is being changed by actuation of the knob 216.

A "press-to-test" switch 224 has a lower set of contacts 224a which when closed block the passage of signal pulses through the digit steering generator 211 and an upper set of contacts 224b which when closed set a particular data reading (e.g., 99900) into the data storage unit 212 so that it appears on the indicator 213. The switch 234 is utilized during trouble-shooting and testing operations to determine whether the data storage unit 212 and indicator 213 are working properly.

Most of the circuits illustrated above are in block diagram form. They consist essentially of conventional components, whose details are not necessary for an understanding of the invention or for construction and use of the invention. In many cases, conventional circuit elements such as amplifiers to overcome line losses, inverters, and in some cases differentiating networks to provide peak pulse signals have been ommitted in the interest of simplification of the disclosure.

We claim:

1. Apparatus for measuring a characteristic of a liquid, including:
   a. an oscillator;
   b. capacitor means at least partly submerged in the liquid whose characteristic is to be measured and having a capacitance varying with said characteristic, said capacitor means having two terminals;
   c. means conductively connecting the output of the oscillator to one terminal of the capacitor means;
   d. alternating current to direct current converter means having an output and an input connected to the other terminal of said capacitor means;
   e. direct current signal comparator means having an output signal terminal, and two direct current input terminals, one of which is connected to the output of said converter means, said comparator means being effective to produce an output signal representing the difference between the input signals applied thereto;
   f. digital means controlled by the output signal of said comparator means and having a digital output;
   g. digital-to-analog converter means having a digital input connected to the digital output of said digital means and a direct current output;
   h. a connection between the output of said digital-to-analog converter means and the second direct current input terminal of the comparator;
   i. a digital indicator operatively connected to the output of said digital means;
   j. storage register means;
   k. gate means operable to connect said storage register means to the output of said digital means;
   l. synchronizing means cooperating with the gate means and operable alternately between a first condition wherein said storage register means is in communication with the output of said digital means, and a second condition wherein said storage register means is not in communication with said digital means; and
   m. means in said synchronizing means to transfer the count from the storage register means to the digital indicator during those intervals when the gate means is not in communication with said digital means.

2. Liquid characteristic measuring apparatus as in claim 1, including:
   a. a compensating capacitor completely submerged in the liquid;
   b. a second AC-DC converter connected to one terminal of said compensating capacitor; and
   c. an attenuation control terminal on the digital-to-analog converter, and a connection between the output of said second AC-DC converter and the attenuation control terminal.

3. Apparatus for measuring a characteristic of a liquid including:
   a. an oscillator;
   b. capacitor means in the liquid whose characteristic is to be measured and having a capacitance varying with said characteristic, said capacitor means having two terminals;
   c. means conductively connecting the output of the oscillator to one terminal of the capacitor means;
   d. comparator means having an output signal terminal and two signal input terminals, one of which is connected to the other terminal of the capacitor means, said comparator means being effective to produce an output signal representing the difference between the input signals applied thereto;
   e. digital means controlled by the output signal of said comparator means and having a digital output;
   f. means connected to said digital output for transmitting signals indicative of the value thereof to the other input terminal of the comparator means;

g. a master digital indicator connected to said digital output and having a plurality of decimal order digit indication means;
h. storage register means;
i. gate means operable to connect said storage register means to said digital output;
j. synchronizing means cooperating with the gate means and operable alternatively between a first condition wherein said storage register means is in communication with said digital output, and a second condition wherein said storage register means is not in communication with said digital output;
k. means in said synchronizing means to transfer the count from the storage register means to the digital indicator during those intervals when the gate means is not in communication with said digital output;
l. a remote indicator located at a distance from said master indicator and also having a plurality of decimal order digit indication means;
m. digit order identification pulse generating means;
n. control pulse lines connecting the synchronizing means and the digit order identification pulse generating means to the remote indicator;
o. data pulse generating means connected to said signal transmitting means at the master indicator; and
p. a data pulse line connecting the data pulse generating means and the remote indicator.

4. Apparatus for measuring a characteristic of a liquid, including:
a. an oscillator;
b. capacitor means in the liquid whose characteristic is to be measured and having a capacitance varying with said characteristic, said capacitor means having two terminals;
c. means conductively connecting the output of the oscillator to one terminal of the capacitor means;
d. comparator means having an output signal terminal, and two signal input terminals, one of which is connected to the other terminal of the capacitor means, said comparator means being effective to produce an output signal representing the difference between the input signals applied thereto;
e. a digital means controlled by the output signal of said comparator means and having a digital output;
f. a connection from the digital output of the digital means to the other input terminal of the comparator means;
g. a master digital indicator connected to the output of said digital means and having a plurality of decimal order digit indication means;
h. gross weight indication means having a plurality of decimal order digit indication means;
i. a manually operable encoder for setting the gross weight indication means;
j. storage register means;
k. gate means operable to connect said storage register means to the output of the digital means;
l. synchronizing means cooperating with the gate means and operable alternately between a first condition wherein said storage register means is in communication with the output of the digital means, and a second condition wherein said storage register means is not in communication with the digital means;
m. means in said synchronizing means to transfer the count from the storage register means to the digital indicator during those intervals when the gate means is not in communication with the digital means; and
n. means operating concurrently with said count transfer means to update the gross weight indication means periodically.

5. Liquid characteristic measuring apparatus as in claim 4, including means responsive to actuation of the encoder to update the gross weight indication means continuously during such actuation.

6. Apparatus for measuring the quantity of a liquid in a plurality of tanks, including:
a. measuring apparatus for each tank, comprising:
1. an oscillator;
2. capacitor means in the liquid whose characteristic is to be measured and having a capacitance varying with said characteristic, said capacitor means having two terminals;
3. means conductively connecting the output of the oscillator to one terminal of the capacitor means;
4. comparator means having an output signal terminal and two signal input terminals, one of which is connected to the other terminal of the capacitor means, said comparator means being effective to produce an output signal of predetermined value when the potential at one of said two signal input terminals is greater than that at the second and to produce an output signal of contrasting value when the potential at the second signal input terminal is greater;
5. up/down counter means having a directional input controlled by the output signal of said comparator means, and a digital output;
6. means connected to the digital output of the up/down counter means for transmitting signals indicative of the value of the digital output to the other input terminal of the comparator means;
7. a master digital indicator connected to the output of the storage register means and having a plurality of decimal order digit indication means;
8. storage register means having an input and an output;
9. first gate means operable selectively either to connect the input of the storage register means to the output of the counter means or to connect the output of the storage register means to the master digital indicator;
10. data pulse generating means;
11. second gate means selectively operable to connect said data pulse generating means to any of the decimal orders of said digital output;
b. a totalizer, including:
1. synchronizing means for controlling the first gate means of all the tank measuring apparatus;
2. decimal order identification pulse generating means;
3. a plurality of control pulse lines connecting the synchronizing means and the decimal order identification pulse generating means to first gate means for the respective tanks;
4. a plurality of data pulse lines connecting the respective data pulse generating means and the totalizer; and 5. a totalizer digital indicator having a plurality of decimal order digit indication means and connected to said data pulse lines.

7. Liquid measuring apparatus as in claim 6, including:
   a. gross weight indication means in the totalizer and having a plurality of decinaml order digit indication means;
   b. a manually operable encoder for setting the gross weight indication means;
   c. means operating concurrently with the totalizer indicator to update the gross weight indication means periodically.

8. Liquid measuring apparatus as in claim 6, including means at the totalizer indicator for testing all the master indicators and the totalizer indicator by inserting an arbitrary indication into each of the master indicators and hence the sum of those arbitrary indications into the totalizer indicator.

9. Liquid measuring apparatus as in claim 6, including:
   a. a master panel supporting all the master indicators for the several tanks;
   b. a repeater indicator for each master indicator, located adjacent its respective tank; and
   c. telemetric means connection each master indicator to its corresponding repeater indicator so that the repeater indicator shows the reading of the master indicator.

10. Liquid measuring apparatus as in claim 9, including, in the measuring apparatus for each tank:
    a. standby synchronizing pulse generating means;
    b. standby decimal order identification pulse generating means; and
    c. means responsive to nonreceipt of synchronizing pulses or digit order identification pulses from the totalizer to place both said standby generating means in communication with the control pulse line.

11. Liquid measuring apparatus as in claim 9, including, at each repeater indicator, means for testing the repeater indicator by inserting an arbitrarily selected figure into the repeater indicator.

12. Apparatus for measuring the quantity of liquid in a plurality of tanks, including:
    a. measuring apparatus comprising, for each tank:
       1. liquid quantity sensing means;
       2. counter means controlled by the sensing means and having output lines for each of a plurality of decimal orders;
       3. decimal digit counting pulse generating means; and
       4. gate means selectively operable to connect said pulse generating means to any of the output lines;
    b. a totalizer, including:
       1. decimal order identification pulse generating means having a plurality of output terminals corresponding in number to said plurality of tanks and being effective during each of a plurality of continuous time periods corresponding in number to said decimal orders to produce at said output terminals in sequence a series of pulses separated in time and identifying a particular digit order;
       2. steering signal generating means having a plurality of output lines corresponding in number to said decimal orders and effective during each of said time periods to send a steering signal on one only of said output lines;
       3. summing means having a plurality of decimal orders; and
       4. a totalizer digital indicator operated by said summing means and having a plurality of decimal order digit indication means;
    c. a plurality of identification pulse lines connecting the respective output terminals of the identification pulse generating means to the gate means for the respective tanks;
    d. a plurality of data pulse lines connecting the respective decimal digit counting pulse generating means to the totalizer;
    e. each said digit counting pulse generating means being effective upon receipt of a digit identification pulse at its associated gate means to generate a series of pulses identifying the value of a particular decimal digit at the output of the counter means for the particular tank and to transmit that series of pulses over the data pulse line for that tank to the totalizer; and
    f. said digit steering signal generating means being effective during each said time period to steer all the digit counting pulses from the measuring apparatus of all the tanks to a particular decimal order of said summing means.

13. Apparatus for determining the quantity of liquid in a tank, comprising first capacitor means at least partially submerged in the liquid in the tank and having a capacitance that varies with the level of liquid in the tank, second capacitor means at least partially submerged in the liquid in the tank and having a capacitance that varies in accordance with the density of said liquid, oscillator means for supplying a signal to said first and second capacitor means, output signal generating means for generating an output signal representative of the ratio between said capacitances, and switching means having a plurality of switching modes, said switching means being operative in one of said switching modes to substitute capacitors having fixed capacitances for said first and second capacitor means, said switching means being operative in a second mode to substitute a capacitor having a fixed capacitance for one of said capacitor means with no substitution for the other of said capacitor means.

14. Apparatus as in claim 13, in which said one of said capacitor means substituted for is said second capacitor means.

* * * * *

UNITED STATES PATENT OFFICE
CERTIFICATE OF CORRECTION

Patent No. 3,830,090          Dated August 20, 1974

Inventor(s) Walter Hersch and Ira A. Rubel

It is certified that error appears in the above-identified patent and that said Letters Patent are hereby corrected as shown below:

Col. 6, line 58, "since" should read "sine".

Col. 7, line 16, "valve" should read "value"

Col. 12, line 31, "Transmissions" should read "Transmission"

Col. 13, line 51, "or" should read "nor"

Col. 17, line 26, "connection" should read "connecting"

Signed and sealed this 31st day of December 1974.

(SEAL)
Attest:

McCOY M. GIBSON JR.                C. MARSHALL DANN
Attesting Officer                  Commissioner of Patents